US008751407B1

(12) United States Patent
Murray

(10) Patent No.: US 8,751,407 B1
(45) Date of Patent: Jun. 10, 2014

(54) SYSTEM AND METHOD FOR CREATING AN AD HOC SOCIAL NETWORKING FORUM FOR A COHORT OF USERS

(71) Applicant: Wingit IT, LLC, Germantown, MD (US)

(72) Inventor: Steven Randall Murray, Germantown, MD (US)

(73) Assignee: Wingit IT, LLC, Germantown, MD (US)

( * ) Notice: Subject to any disclaimer, the term of this patent is extended or adjusted under 35 U.S.C. 154(b) by 0 days.

(21) Appl. No.: 13/933,045

(22) Filed: Jul. 1, 2013

(51) Int. Cl.
*G06Q 30/02* (2012.01)
*G06Q 10/10* (2012.01)
*G06Q 10/06* (2012.01)
*G06Q 40/02* (2012.01)
*G06Q 99/00* (2006.01)
*G06Q 50/00* (2012.01)

(52) U.S. Cl.
CPC ..................................... *G06Q 50/01* (2013.01)
USPC ........................................... 705/319; 705/1.1

(58) Field of Classification Search
USPC .................................................. 705/1.1–912
See application file for complete search history.

(56) References Cited

U.S. PATENT DOCUMENTS

| 8,284,748 | B2 | 10/2012 | Borghei | 370/338 |
| 2005/0076078 | A1 | 4/2005 | Salton | 709/201 |
| 2008/0091445 | A1 | 4/2008 | Mihic | 705/1 |
| 2009/0048927 | A1* | 2/2009 | Gross | 705/14 |
| 2009/0307003 | A1* | 12/2009 | Benyamin et al. | 705/1 |
| 2011/0016399 | A1 | 1/2011 | Yasrebi et al. | 715/734 |
| 2011/0153740 | A1 | 6/2011 | Smith et al. | 709/204 |
| 2011/0161130 | A1* | 6/2011 | Whalin et al. | 705/7.18 |
| 2011/0238755 | A1 | 9/2011 | Khan et al. | 709/204 |
| 2011/0289433 | A1* | 11/2011 | Whalin et al. | 715/753 |
| 2012/0084169 | A1 | 4/2012 | Adair et al. | 705/26.3 |
| 2012/0179980 | A1 | 7/2012 | Whalin et al. | 715/753 |
| 2012/0179981 | A1* | 7/2012 | Whalin et al. | 715/753 |
| 2012/0290950 | A1* | 11/2012 | Rapaport et al. | 715/753 |
| 2012/0311037 | A1 | 12/2012 | Sivasubramaniam et al. | 709/204 |
| 2012/0323689 | A1 | 12/2012 | Metcalf et al. | 705/14.58 |
| 2012/0324018 | A1 | 12/2012 | Metcalf et al. | 709/206 |
| 2013/0073473 | A1* | 3/2013 | Heath | 705/319 |
| 2013/0097246 | A1 | 4/2013 | Zifroni et al. | 709/204 |
| 2013/0212494 | A1* | 8/2013 | Heiferman et al. | 715/753 |
| 2013/0219298 | A9* | 8/2013 | Whalin et al. | 715/753 |

* cited by examiner

*Primary Examiner* — Jonathan Ouellette
(74) *Attorney, Agent, or Firm* — Pillsbury Winthrop Shaw Pittman LLP

(57) ABSTRACT

The invention relates to a system and method for facilitating creation of an ad hoc social networking forum for a cohort of users based on a determination of whether an ad hoc social networking forum associated with the cohort exists. Responsive to receiving a request from a user of the cohort to join a social networking forum associated with the cohort, a determination may be made as to whether a social networking forum associated with the cohort has already been created. A social networking forum associated with the cohort may be created responsive to a determination that a forum associated with the cohort has not yet been created. The user may be added as a member of the newly created forum.

30 Claims, 6 Drawing Sheets

SYSTEM AND METHOD FOR CREATING AN AD HOC SOCIAL NETWORKING FORUM FOR A COHORT OF USERS

FIELD OF THE INVENTION

The invention relates to a system and method for facilitating creation of an ad hoc social networking forum for a cohort of users based on information related to an experience that may be shared by the cohort of users.

BACKGROUND OF THE INVENTION

Individuals can post content to a variety of electronic forums, including social networking sites, rating sites, websites, portals, and/or other electronic forums at which content may be posted and shared among users. Most forums enable users to connect and share information electronically with those with whom they have a pre-established connection via the forum or publically post content to people whom they may not know. However, when an individual engages (or is planning to engage) in a shared experience, like an airline flight, a concert, and/or other shared experience, the individual may be unaware of how to connect electronically to other individuals that are engaging (or planning to engage) in the same experience without having a pre-established connection with those individuals.

Conventional social networking systems have various limitations and drawbacks. Some conventional social networking systems may allow an individual to create a social networking group forum for individuals who share a same geographic location or individuals who are currently in a similar type of location. These social networking systems may restrict creation of and/or participation in a forum based on a current location of an individual. For example, some social networking systems may create a social networking group forum based on GPS coordinates of a computing device associated with the individual. However, these social networking systems typically allow an individual who is at or near the location to connect, regardless of whether that individual is associated with other individuals in the social networking group such as by having a pre-established relationship, sharing common interests, planning to engage in similar activities, and/or having other associations. Further, even if an individual had a pre-established relationship, shared an interest or planned to engage in a similar activity with other individuals in these social networking groups, these social networking systems may require that the individual share a location with the other individuals in the group to join the group.

Other conventional social networking systems may facilitate creation of a social networking group related to a particular topic or subject. One problem with such systems is that multiple groups can be created for the same topic.

Conventional social networking systems suffer from these and other drawbacks.

SUMMARY OF THE INVENTION

The invention solving these and other drawbacks of conventional systems relates to a system and method for facilitating creation of an ad hoc social networking forum for a cohort of users based on information related to an experience that may be shared by the cohort of users. A cohort of users may comprise, for example, one or more persons that have a pre-established association with an experience scheduled to occur at a predetermined time, predetermined date and a predetermined location. The system may obtain experience information related to an experience shared by the cohort of users prior to a user of the cohort indicating an interest to join an ad hoc social networking forum for the cohort. In this manner, the system may obtain and pre-store experience information for an experience shared by a cohort of users without any user of the cohort having indicated an interest in joining an ad hoc social networking forum for the cohort. Having pre-stored experience information for an experience shared by a cohort of users, the system may then receive an indication from a user of the cohort to join the social networking forum for a cohort of users that may engage in the shared experience.

Responsive to receiving a request from a user of a cohort indicating an interest to c join a social networking forum associated with the cohort based on information related to an experience that is shared by the cohort of users, the system may determine whether a social networking forum associated with the cohort has already been created. The system may create a social networking forum associated with the cohort responsive to a determination that a forum associated with the cohort has not yet been created. The system may add the user of the cohort as a member of the newly created forum. Responsive to a second user of the cohort attempting to join the forum associated with the cohort after the forum has been created, the system may add the second user as another member of the social networking forum responsive to a determination that the forum associated with the cohort has already been created.

The social networking forum may be used as a platform for its members to engage in social networking communication, plan for the shared experience, share information related to the shared experience, vote on an issue presented to the forum, rate content presented to the forum, participate in auctions conducted via the forum, interact with third parties that may present content to the forum, and/or otherwise participate in the forum. The social networking forum may also provide a platform by which a provider of the shared experience and/or third parties related to the shared experience may communicate information related to the shared experience, leverage the content shared by the members via the forum, and/or otherwise participate in the forum.

In some implementations, the system may automatically obtain experience information by querying the Internet and/or other databases that may include experience information. In some implementations, the system may receive the experience information from a provider of a shared experience.

Experiences may include taking a same flight, taking a same bus, taking a same train, attending a same sporting event, attending a same concert, attending a same play, attending a same art show, attending a same exhibition, attending a launch of a same product (e.g., a movie, an electronic gadget, and/or other product) and/or other shared experience between a plurality of persons that is scheduled to occur at a predetermined time, predetermined date and a predetermined location. A user may be associated with an experience by buying a ticket for the experience, registering for the experience, and/or otherwise performing an action that indicates that the user plans to engage in the experience. As such, providing a social network forum for a cohort of users allows a first user of the cohort and a second user of the cohort who each plan to share the same experience an opportunity to communicate before, during, and/or after the shared experience without having to have a pre-established relationship.

A system for facilitating creation of an ad hoc social network for a cohort of users may comprise a computing device including a physical processor configured to perform some or all of a functionality of a plurality of modules. In some implementations, the computing device may comprise a non-transitory, tangible computer-readable storage medium with an executable program stored thereon, wherein the program instructs a microprocessor to perform some or all of the functionality of the plurality of modules. The plurality of modules may include, for example, a cohort management module, a forum management module, a forum content sharing module, a forum rating module, a forum voting module, a forum auction module, a third party management module, a role-based permissions module, a storage module, a reporting module, and/or other modules. In some implementations, the plurality of modules may also comprise a provider management module.

The cohort management module may be configured to store information related to a cohort and generate a unique identifier for the cohort. The forum management module may be configured to receive a request to join a forum associated with a cohort, determine whether a forum has been created in association with the cohort, and, responsive to the determination that the forum has not been created, create the forum. The forum content sharing module may facilitate sharing of content between one or more members of a forum. The forum rating module may be configured to facilitate rating of an item of content shared in a forum. The forum voting module may be configured to present items of content for members of a forum for voting and facilitate tallying of votes received by one or more members of the forum. The forum auction module may be configured to present items for auction and facilitate bidding and winning an auction item by one or more members of a forum. The third party management module may be configured to facilitate registration of third parties with the system, provide an interface for third parties to present content to a forum, provide relevant items of content shared in the forum to third parties, and/or otherwise manage the access of third parties to members and/or content of the forum. The role-based permission module may be configured to tailor access to the system based on roles of various users including, for example, a role in the system, a role in a cohort, and/or other roles. The storage module may be configured to store information related to system usage, one or more cohorts, and/or one or more forums. The reporting module may be configured to facilitate analysis and report information related to system usage, one or more cohorts, and/or one or more forums. The provider management module may be configured to facilitate registration of a provider of a shared experience, storage of information related to a cohort associated with the shared experience, management of a forum associated with the cohort, and/or other functionality related to managing the shared experience.

The cohort management module may be configured to store information related to a cohort and generate a unique identifier for the cohort. The unique identifier may be a human readable identifier and/or other type of identifier. For example, for an individual cohort, the cohort management module may be configured to store experience information such as an identification of the experience shared by the users of the cohort, a predetermined time at which the experience is expected to occur, a predetermined date on which the experience is expected to occur, a predetermined location at which the experience is expected to occur, a type of the experience, a sub-type of the experience, and/or other information related to the experience, one or more users of the cohort, contact information for one or more users of the cohort, a forum indicator indicating whether an associated social networking forum has been created for the cohort, a set of authorized users for the cohort, and/or other information related to the cohort.

The types of experiences for a cohort may be preset by the system, set by a provider of the shared experience associated with the cohort, set by the source providing information related to the cohort, and/or otherwise determined. A type of experience may comprise, for example, transportation, sporting event, entertainment event, family event, art event, and/or other type of shared experience between a plurality of persons with a pre-established connection to the experience that is scheduled to occur at a predetermined time, predetermined date and a predetermined location. A type of experience may include a plurality of sub-types, where the sub-types are delineated by one or more values associated with a set of one or more respective items of related information. For a type of transportation, a sub-type may be delineated by, for example, medium of travel (e.g., air travel, train travel, bus travel, and/or other mode of transportation), terminal at which transportation is to occur, transportation carrier, origination location, destination location, and/or other information related to travel. For a type of sporting event, sub-types may be delineated, for example, by one or more sports team involved in the sporting event. In another example, for a type of sporting event, sub-types may be delineated by type of sport, by type of league (e.g., professional, college, division, and/or other type of league), by arena in which the sporting event is to occur, and/or by other information related to sporting events. Other examples of types and/or sub-types of experiences exist.

The cohort management module may be configured to receive information related to the cohort from an individual associated with the shared experience of the cohort (e.g., a provider of the shared experience, a user of the cohort, and/or other individual), from publicly available information related to the shared experience (e.g., an RSS feed, publicly available transportation time tables, and/or other public information), from an administrator of the system, and/or from another source with information relating to the cohort.

The cohort management module may be configured to generate a unique identifier based on the information related to cohort. The unique identifier may be a human readable identifier, and/or other type of identifier. In some implementations, the cohort management module may be configured to select information to generate the identifier based on a type and/or sub-type of experience associated with the cohort. For example, for a cohort associated with a shared experience with a type of transportation, a time, date, and provider of transportation may be used to generate an identifier. For a cohort associated with a shared experience with a type of sporting event, a date, time, and sports team may be used to generate an identifier. In some implementations, the cohort management module may be configured to select the same information to generate the identifier regardless of type and/or sub-type of the experience associated with the cohort. For example, a time, date, location, identifier of the experience, and/or other information related to the cohort may be used to generate an identifier.

The forum management module may be configured to manage a plurality of forums. The forum management module may be configured to facilitate searching, by a user of a cohort, for the cohort and/or a forum associated with the cohort. The user may search for the cohort and/or the forum by a unique identifier associated with the cohort, by keyword search of information related to the cohort (e.g, by experience information, and/or other information related to the cohort), by type and/or sub-type of the experience associated with the cohort, based on a current location of the user, based on a current time and date of the search, and/or based on other information related to a cohort. In some implementations, based on a current location of a user, the forum management module may be configured to facilitate display of cohorts within a predetermined distance of the user's current location. For example, the forum management module may be configured to display a map of a current location of the user with one or more pins displayed in the map to indicate respective one or more cohorts at the one or more locations at which the one or more pins are dropped. In some implementations, the forum management module may be configured to display a selectable list of cohorts which the user may join. The selectable list may be delineated by type and/or sub-type of experience associated with the cohort.

In some implementations, the forum management module may be configured to receive a request from a first user of the cohort to join a forum associated with the cohort. Responsive to receiving the request from the first user, the forum management module may be configured to determine whether a forum has been created in association with the cohort. Responsive to the determination that the forum has not been created, the forum management module may be configured to create the forum and add the first user as a member of the forum. The forum management module may be configured to receive, from a second user of the cohort, a request to join the forum associated with the cohort. The forum management module may be configured to determine whether the forum has been created in association with the cohort, and, responsive to the determination that the forum has been created, add the second user as another member of the forum. In some implementations, before adding a user as a member of a forum, the forum management may determine whether a user requesting to join a forum is an authorized user of a cohort based on the information related to the cohort.

The forum management module may also be configured to police content shared via the forum. For example, the forum management module may flag and/or remove offensive, mature, threatening, and/or otherwise inappropriate content from the forum. In another example, the forum management module may notify government authorities of content that may seem suspicious, illegal, and/or otherwise pose a threat to public safety.

The forum content sharing module may facilitate sharing of content between one or more members of the forum. In some implementations, one or more identifiers may be associated and/or included with an item of content. An identifier may identify, for example, a member of the forum, a time, a place, a location, another forum, a third party identifier, a social media tag, and/or other identifier for the item of content. In some implementations, the member sharing the content with the forum may indicate that some or all portions of the item of content should be shared, may indicate whether the content may be shared to the general public, may indicate other members of the forum with whom the portions of the item are shared, and/or may otherwise restrict sharing of the item of content.

In some implementations, the forum content sharing module may facilitate the sharing of at least some of the content items over one or more social media platforms. In some implementations, the forum content sharing module may allow a forum member to tag or link an entity such as a person, place, and/or location to an item of content. For example, one or more social media platforms with which a forum member is associated may search for the entity and may present potential entities that match the tagged or linked entity to the forum member. The forum member may share the item of content with one or more of the potential entities. For example, the forum member may share an item of content on a social media page or via a social media account of the potential entity. In another example, forum content sharing module may facilitate exporting of items of content to a social media platform. For example, the forum content sharing module may facilitate the inclusion of hashtags with content such that the content may be shared via a social media platform such as TWITTER, INSTAGRAM, FACEBOOK, and/or other social media platforms that recognize hashtags.

The forum rating module may be configured to facilitate rating of an item of content shared in the forum. In some implementations, the forum rating module may be configured to set a time limit, one or more accepted types of authors (e.g., a member of the forum, an administrator of the system, a third party, a provider of the shared experience, and/or other author), one or more accepted types of ratings (e.g., stars, scores, comments, thumbs up/thumbs down, and/or other rating type) and/or other parameters related to rating an item of content. In some implementations, any item of content shared via the forum may be rated. In some implementations, an item of content marked as available for rating may be rated. The forum rating module may be configured to notify the author of an item of content of the results of the rating.

The forum voting module may be configured to present items of content for members of the forum for voting and facilitate tallying of votes received by one or more members of the forum. In some implementations, the forum voting module may be configured to set a time limit, one or more accepted types of authors (e.g., a member of the forum, an administrator of the system, a third party, a provider of the shared experience, and/or other author), and/or other restrictions related to voting on an item of content. In some implementations, any item of content shared via the forum may be voted on. In some implementations, an item of content marked as available for voting may be voted on. The forum voting module may be configured to notify the author of an item of content of the results of the voting.

The forum auction module may be configured to present items for auction and facilitate bidding and winning an auction item by one or more members of the forum. In some implementations, the forum auction module may be configured to set a time limit, one or more accepted types of presenters of an auction item (e.g., a member of the forum, an administrator of the system, a third party, a provider of the shared experience, and/or other author), one or more accepted types of bidders (e.g., a member of the forum, an administrator of the system, a third party, a provider of the shared experience, and/or other author), delivery method of the auction item, minimum bid, maximum bid, number of bids per member, and/or other restrictions related to the auction. The forum auction module may be configured to notify the author of an item of content presented for an auction of the results of the auction.

The third party management module may be configured to facilitate registration of third parties with the system, provide an interface for third parties to present content to the forum, provide relevant items of content shared in the forum to third parties, and/or otherwise manage access of third parties to members and/or content of the forum. In some implementations, the third party management module may be configured to allow a third party with access to a forum to participate in the forum in a manner the same or similar to a member of the forum. In some implementations, the third party management module may be configured to restrict participation by a third party in a forum. The third party management module may be configured to require a third party to pay a transaction fee for access to the system, for particular types of access to a forum, for reports related to access of content provided by the third party, and/or for other types of participation in the system.

The role-based permission module may be configured to tailor access to the system based on roles of various users including, for example, a role in the system, a role in a cohort, a role as a third party, a role as a provider of the shared experience, and/or other roles. The one or more roles may include system-level roles, cohort-level roles, provider-level roles, third party level roles, and/or other types of roles. System-level roles may grant access to various system features such as for example, access to one or more modules, access to content stored at a storage module, and/or other access to system features. System-level roles may be configured, for example, to manage storage of cohort information, access to third parties, and/or other system-level features. Different system-level roles may be granted that provide access to different system features. Cohort-level roles may grant access to various forum features such as, for example, access to the content shared by the forum, access to contact information of users of the cohort, and/or other access. Different cohort-based roles may be granted that provide access to different cohort features. The role-based permissions module may maintain a plurality of roles, including, for example, administrator, cohort user, third party, provider of shared experience, and/or other roles.

The storage module may be configured to store information related to system usage, one or more cohorts, and/or one or more forums. For example, the storage information may be configured to store information related to cohorts, forums, third parties, and/or other information obtained, accessed, and/or processed via the system. The storage module may further store content developed and/or shared via the system.

The reporting module may be configured to facilitate analysis and report information related to system usage, one or more cohorts, and/or one or more forums. The reporting module may also be configured to prepare and/or display statistics and/or reports regarding the information related to system usage, cohort information, forum content, third party access, and/or other information obtained, accessed, and/or processed by the system. For example, the reporting module may prepare and/or display a report describing sharing of third party content by members of a forum.

In some implementations, the system may also comprise a provider management module. The provider management module may be configured to facilitate registration of a provider of a shared experience, storage of information related to a cohort associated with the shared experience, management of a forum associated with the cohort, and/or other functionality related to managing the shared experience. The provider management module may be configured to allow a provider of a shared experience to control access and participation by members, third parties, administrators of the system, and/or other individuals to the forum associated with a cohort for the shared experience.

The provider management module may also be configured to allow a provider to restrict the functionality available via the forum. For example, the provider management module may be configured to allow a provider to enable voting and rating content items in the forum, but not allow auctioning of items in the forum. In another example, the provider management module may be configured to allow a provider to restrict third party participation in the module, monitor the reports and/or statistics provided to third parties in relation to the forum, and/or otherwise control third party access to the forum. Other examples and configurations of restrictions of functionality exist.

In some implementations, a same provider may be associated with a plurality of shared experiences (and a plurality of respective cohorts). The provider management module may be configured to allow a provider to manage some or all associated forums in a same way or on a case-by-case individual basis. Examples of providers include airports, airlines, transportation companies, entertainment venues, sports arenas, sports leagues, and/or other entities that provide shared experiences.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
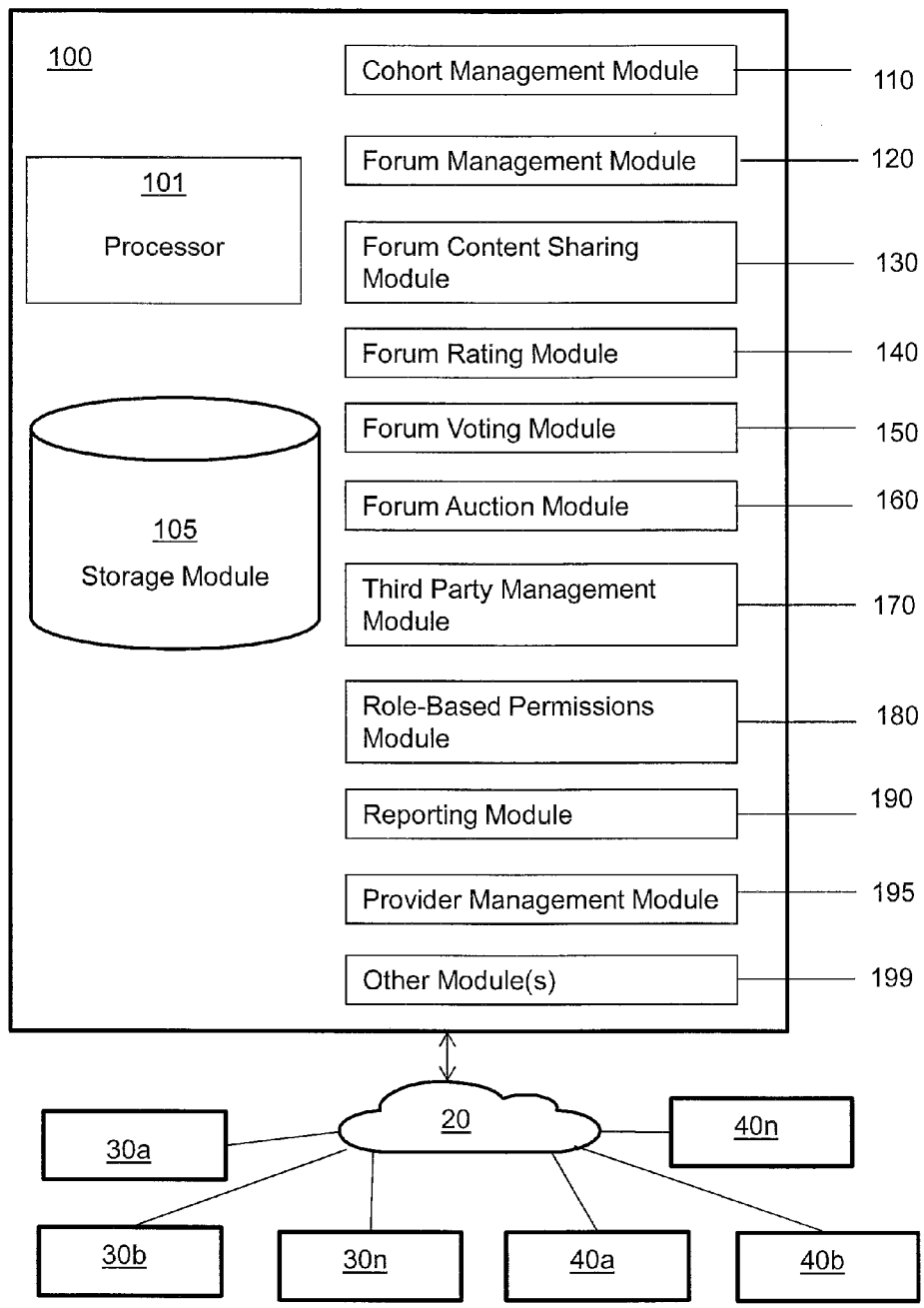
FIG. 1 illustrates a block diagram of an exemplary system for facilitating creation of an ad hoc social networking forum for a cohort of users, according to various implementations of the invention.

FIG. 1 illustrates a diagram of a system 10 for facilitating creation of an ad hoc social network for a cohort of users, according to an implementation of the invention. The system 10 may include a network 20, a computing device 100, one or more user computing devices 30a, 30b, 30n, one or more provider computing devices 40a, 40b, . . . , 40n, and/or other components. The computing device 100 may include a processor 101 configured to perform some or all of a functionality of a plurality of modules. In some implementations, the computing device 100 may comprise a non-transitory, tangible computer-readable storage medium with an executable program stored thereon, wherein the program instructs a microprocessor to perform some or all of the functionality of the plurality of modules. The plurality of modules may include, for example, a cohort management module 110, a forum management module 120, a forum content sharing module 130, a forum rating module 140, a forum voting module 150, a forum auction module 160, a third party management module 170, a role-based permissions module 180, a storage module 105, a reporting module 190, and/or other modules. In some implementations, the plurality of modules may also comprise a provider management module 195.

A user of a cohort may use the system 10 to create a social networking forum for the cohort, via which users of the cohort may electronically share content based on information related to an experience that may be shared by the cohort of users. The system 10 may obtain experience information related to an experience shared by the cohort of users prior to a user of the cohort indicating an interest to join an ad hoc social networking forum for the cohort. Having pre-stored experience information for an experience shared by a cohort of users, the system 10 may then receive an indication from a user of the cohort to join the social networking forum for a cohort of users that may engage in the shared experience.

A cohort of users may comprise, for example, one or more persons that have a pre-established association with an experience scheduled to occur at a predetermined time, predetermined date and a predetermined location. Experiences may include taking a same flight, taking a same bus, taking a same train, attending a same sporting event, attending a same concert, attending a same play, attending a same art show, attending a same exhibition, attending a launch of a same product (e.g., a movie, an electronic gadget, and/or other product) and/or other shared experience between a plurality of persons that is scheduled to occur at a predetermined time, predetermined date and a predetermined location. A user may be associated with an experience by buying a ticket for the experience, registering for the experience, and/or otherwise performing an action that indicates that the user plans to engage in the experience.

The cohort management module 110 may be configured to store information related to a cohort and generate a unique identifier for the cohort. The forum management module 120 may be configured to receive a request to join a forum associated with a cohort, determine whether a forum has been created in association with the cohort, and, responsive to the determination that the forum has not been created, create the forum. The forum content sharing module 130 may facilitate sharing of content between one or more members of a forum. The forum rating module 140 may be configured to facilitate rating of an item of content shared in a forum. The forum voting module 150 may be configured to present items of content for members of a forum for voting and facilitate tallying of votes received by one or more members of the forum. The forum auction module 160 may be configured to present items for auction and facilitate bidding and winning an auction item by one or more members of a forum. The third party management module 170 may be configured to facilitate registration of third parties with the system, provide an interface for third parties to present content to a forum, provide relevant items of content shared in the forum to third parties, and/or otherwise manage the access of third parties to members and/or content of the forum. The role-based permission module 180 may be configured to tailor access to the system based on roles of various users including, for example, a role in the system, a role in a cohort, and/or other roles. The storage module 105 may be configured to store information related to system usage, one or more cohorts, and/or one or more forums. The reporting module 190 may be configured to facilitate analysis and report information related to system usage, one or more cohorts, and/or one or more forums. The provider management module 195 may be configured to facilitate registration of a provider of a shared experience, storage of information related to a cohort associated with the shared experience, management of a forum associated with the cohort, and/or other functionality related to managing the shared experience.

The cohort management module 110 may be configured to store information related to a cohort and generate a unique identifier for the cohort. The identifier may be a human-readable identifier and/or other type of identifier. For example, for an individual cohort, the cohort management module 110 may be configured to store experience information such as an identification of the experience shared by the users of the cohort, a predetermined time at which the experience is expected to occur, a predetermined date on which the experience is expected to occur, a predetermined location at which the experience is expected to occur, a type of the experience, a sub-type of the experience, and/or other information related to the experience, one or more users of the cohort, contact information for one or more users of the cohort, a forum indicator indicating whether an associated social networking forum has been created for the cohort, a set of authorized users for the cohort, and/or other information related to the cohort.

The types of experiences for a cohort may be preset by the system, set by a provider of the shared experience associated with the cohort, set by the source providing information related to the cohort, and/or otherwise determined. A type of experience may comprise, for example, transportation, sporting event, entertainment event, family event, art event, and/or other type of shared experience between a plurality of persons with a pre-established connection to the experience that is scheduled to occur at a predetermined time, predetermined date and a predetermined location. A type of experience may include a plurality of sub-types, where the sub-types are delineated by one or more values associated with a set of one or more respective items of related information. For a type of transportation, a sub-type may be delineated by, for example, medium of travel (e.g., air travel, train travel, bus travel, and/or other mode of transportation), terminal at which transportation is to occur, transportation carrier, origination location, destination location, and/or other information related to travel. For a type of sporting event, sub-types may be delineated, for example, by one or more sports team involved in the sporting event. In another example, for a type of sporting event, sub-types may be delineated by type of sport, by type of league (e.g., professional, college, division, and/or other type of league), by arena in which the sporting event is to occur, and/or by other information related to sporting events. Other examples of types and/or sub-types of experiences exist.

The cohort management module 110 may be configured to receive information related to the cohort from an individual associated with the shared experience of the cohort (e.g., a provider of the shared experience, a user of the cohort, and/or other individual), from publicly available information related to the shared experience (e.g., an RSS feed, publicly available transportation time tables, and/or other public information), from an administrator of the system, and/or from another source with information relating to the cohort. The source of information for a cohort may be determined by a type associated with the cohort.

In some implementations, the cohort management module 110 may be configured to request updated information related to the cohort. For example, the cohort management module 110 may be configured to request updated information relating to time, date, location, set of authorized users, and/or other logistical information related to the shared experience. The request for updated information may be made on a periodic basis (e.g., after pre-determined time intervals), may be scheduled by the source of information for the cohort when information related to the cohort is initially stored in the system, and/or may be performed at other time periods. The cohort management module 110 may request updated information based on a request from the source of the information related to the cohort, based on a type and/or sub-type of the cohort, and/or based on other information related to the cohort. For example, for a cohort related to a shared experience of taking a same flight, the cohort management module 110 may periodically request scheduled departure time information from an RSS feed issued by the airline, by the airport, and/or by another air travel source.

The cohort management module 110 may be configured to generate a unique identifier based on the information related to cohort (e.g., experience information and/or other information related to the cohort). In some implementations, the cohort management module 110 may be configured to select information to generate the identifier based on a type and/or sub-type of experience associated with the cohort. For example, for a cohort associated with a shared experience with a type of transportation, a time, date, and provider of transportation may be used to generate an identifier. For a cohort associated with a shared experience with a type of sporting event, a date, time, and sports team may be used to generate an identifier. In some implementations, the cohort management module 110 may be configured to select the same information to generate the identifier regardless of type and/or sub-type of the experience associated with the cohort. For example, a time, date, location, identifier of the experience, and/or other information related to the cohort may be used to generate an identifier. For example, for a cohort related to a shared experience of taking a same flight, the cohort management module 110 may generate a unique identifier based on time, date, and one or more of: airline, origination airport and destination airport.

The forum management module 120 may be configured to manage a plurality of forums. The forum management module 120 may be configured to facilitate searching, by a user of a cohort, for the cohort and/or a forum associated with the cohort. The user may search for the cohort and/or the forum by a unique identifier associated with the cohort, by keyword search of information related to the cohort, by type and/or sub-type of the experience associated with the cohort, based on a current location of the user, based on a current time and date of the search, and/or based on other information related to a cohort. In some implementations, the forum management module 120 may be configured to display a selectable list of cohorts. The list of cohorts may be delineated by type and/or sub-type of experience associated with the cohort.

In some implementations, based on a current location of a user, the forum management module 120 may be configured to facilitate display of one or more cohorts within a predetermined distance of a current location of the user. For example, the forum management module 120 may be configured to display a map of a current location of the user with one or more pins displayed in the map to indicate respective one or more cohorts at the one or more locations at which the one or more pins are dropped. In some implementations, the forum management module 120 may be configured to display a map of a chosen location of a user as well, where the map may display one or more pins corresponding to respective one or more cohorts.

In some implementations, responsive to a user clicking on, hovering over, and/or otherwise interacting with a pin, some or all information related to a corresponding cohort may be displayed. For example, the unique identifier for the cohort, whether a forum has been created in association with the cohort, a pre-determined time, predetermined date, and/or other information related to the cohort may be displayed. In an example in which a cohort is related to a shared experience of taking a same flight, the forum management module 120 may display one or more pins corresponding to respective one or more gates at an airport to display the corresponding cohorts for the respective one or more flights. In some examples, more than one pin may be displayed at a gate location in an airport, as more than one flight may be departing from that gate.

In some implementations, the forum management module 120 may display pins related to respective cohorts with a predetermined time and date within a predetermined time period before and after the current time and current date of the user. In another example, the forum management module 120 may display pins within a predetermined time period before and after a chosen time and date of the user. For example, for a cohort related to a shared experience of taking a same flight, the forum management module 120 may display pins related to respective cohorts within a four hour time period of the current time and current date of the user.

In some implementations, the forum management module 120 may be configured to receive a request from a first user of the cohort to join a forum associated with the cohort. Responsive to receiving the request from the first user, the forum management module 120 may be configured to determine whether a forum has been created in association with the cohort. For example, the forum management module 120 may determine whether the forum has been created by determining whether the forum indicator stored in the information related to the cohort indicates that an associated social networking forum has been created.

Responsive to the determination that the forum has not been created, the forum management module 120 may be configured to create the forum and add the first user as a member of the forum. The forum management module 120 may be configured to store information related to the forum (e.g., an identifier of the forum, one or more members of the forum, and/or other information related to the forum) with the information related to the cohort. The forum management module 120 may also be configured to update the forum indicator for the cohort to indicate that a social networking forum associated with the cohort has been created.

Responsive to the determination that the forum has been created, the forum management module 120 may be configured to obtain information related to the forum from the information related to the cohort, and add the user as a member of the cohort. For example, the forum management module 120 may be configured to receive, from a second user of the cohort, a request to join the forum associated with the cohort. The forum management module 120 may be configured to determine whether the forum has been created in association with the cohort, and, responsive to the determination that the forum has been created, add the second user as another member of the forum.

In some implementations, before adding a user as a member of a forum, the forum management module 120 may determine whether a user requesting to join a forum is an authorized user of a cohort based on the information related to the cohort.

The forum management module 120 may also be configured to police content shared via the forum. For example, the forum management module 120 may flag and/or remove offensive, mature, threatening, and/or otherwise inappropriate content from the forum. In another example, the forum management module 120 may notify government authorities of content that may seem suspicious, illegal, and/or otherwise pose a threat to public safety. The types and/or substance of content policed and/or sent to government authorities may be determined from the source of the information related to the cohort, based on type and/or sub-type related to the cohort, and/or based on other information related to the cohort.

The forum content sharing module 130 may facilitate sharing of content between one or more members of the forum. For example, a member of the forum may electronically share one or more items of content via the forum. In some implementations, one or more identifiers may be associated and/or included with an item of content. An identifier may identify, for example, a member of the forum, a time, a place, a location, another forum, a third party identifier, a social media tag, and/or other identifier for the item of content. In some implementations, the member sharing the item of content with the forum may indicate that some or all portions of the item of content should be shared, may indicate whether the content may be shared to the general public, may indicate other members of the forum with whom the portions of the item are shared, may indicate whether an item of content may be rated, may indicate whether an item of content may be made available for voting, and/or may otherwise restrict sharing of the item of content.

In some implementations, the forum content sharing module 130 may facilitate the sharing of at least some of the content items over one or more social media platforms. In some implementations, the forum content sharing module 130 may allow a forum member to tag or link an entity such as a person, place, and/or location to an item of content. For example, one or more social media platforms with which a forum member is associated may search for the entity and may present potential entities that match the tagged or linked entity to the forum member. The forum member may share the item of content with one or more of the potential entities. For example, the forum member may share an item of content on a social media page or via a social media account of the potential entity. In another example, forum content sharing module may facilitate exporting of items of content to a social media platform. For example, the forum content sharing module 130 may facilitate the inclusion of hashtags with content such that the content may be shared via a social media platform such as TWITTER, INSTAGRAM, FACEBOOK, and/or other social media platforms that recognize hashtags.

The forum rating module 140 may be configured to facilitate rating of an item of content shared in the forum. In some implementations, an item of content may be subject to rating (unless the author sharing the item of content has indicated otherwise). In some implementations, the item of content may be submitted for rating by the author of the item of content. In some implementations, the forum rating module 140 may be configured to set a time limit, one or more accepted types of authors (e.g., a member of the forum, an administrator of the system, a third party, a provider of the shared experience, and/or other author), one or more accepted types of ratings (e.g., stars, scores, comments, thumbs up/thumbs down, and/or other rating type) and/or other restrictions related to rating an item of content.

The forum rating module 140 may facilitate receipt of rating information from one or more members of the forum for an item of content. The forum rating module 140 may also facilitate display of items of content by rating. For example, the forum rating module 140 may be configured to display items of content in order by highest rating to lowest rating, based on whether the items of content have been rated, and/or based on other information related to rating one or more items of content shared via the forum. In some implementations, any item of content shared via the forum may be rated. In some implementations, an item of content marked as available for rating may be rated. The forum rating module may be configured to notify the author of an item of content of the results of the rating, The forum voting module 150 may be configured to present items of content for members of the forum for voting and facilitate tallying of votes received by one or more members of the forum. In some implementations, an item of content may be subject to rating (unless the author sharing the item of content has indicated otherwise). In some implementations, the item of content may be submitted for rating by the author of the item of content. In some implementations, the forum voting module 150 may be configured to set a time limit, one or more accepted types of authors (e.g., a member of the forum, an administrator of the system, a third party, a provider of the shared experience, and/or other author), and/or other restrictions related to voting on an item of content.

The forum voting module 150 may facilitate receipt of voting information from one or more members of the forum for an item of content. The forum voting module 150 may also facilitate display of items of content by associated voting information. For example, the forum voting module 150 may be configured to display items of content in order by highest number of votes to lowest number of votes, based on whether the items of content have been voted on, and/or based on other information related to voting tallies of one or more items of content shared via the forum. In some implementations, any item of content shared via the forum may be voted on. In some implementations, an item of content marked as available for voting may be voted on. The forum voting module 150 may be configured to notify the author of an item of content of the results of the voting.

The forum auction module 160 may be configured to present items for auction and facilitate bidding and winning an auction item by one or more members of the forum. In some implementations, the forum auction module 160 may be configured to set a time limit, one or more accepted types of presenters of an auction item (e.g., a member of the forum, an administrator of the system, a third party, a provider of the shared experience, and/or other author), one or more accepted types of bidders (e.g., a member of the forum, an administrator of the system, a third party, a provider of the shared experience, and/or other author), delivery method of the auction item, minimum bid, maximum bid, number of bids per member, and/or other restrictions related to the auction.

In some implementations, the forum auction module 160 may be configured to display information related to an ongoing auction of an item. For example, the forum auction module may be configured to display one or more of: information related to the item of content to be auctioned, a minimum bid, a current bid, a member of the forum who submitted the current bid, a time limit for the auction, a time limit for the round of bidding, and/or other information related to the auction of the item of content. In some implementations, the forum auction module 160 may comprise an intelligent agent configured to conduct an auction of a content item. In some implementations, the forum auction module 160 may be configured to receive, from one or more forum members, bids for an item of content. Responsive to receiving a bid for an item of content, the forum auction module 160 may update a current bid for the item of content. The forum auction module 160 may be configured to notify the author of an item of content presented for an auction of the results of the auction. For example, for a cohort related to a shared experience of taking a same flight, the forum auction module 160 may be configured to facilitate an auction of a seat available on the flight, an upgrade on a flight, food and/or beverage available on the flight, media to consume on the flight, and/or other items of content related to the flight.

In some implementations, the forum auction module 160 may also facilitate display of items of content by associated auction information. For example, the forum auction module 160 may be configured to display items of content in order by highest to lowest bid amount for an item at an ongoing auction, highest to lowest price at which item was sold, highest to lowest number of bids received for an item of content, items of content available for auction, and/or based on other information related to one or more items of content available for auction via the forum.

In some implementations, the forum auction module 160 may conduct an auction of an item of content in a manner the same or similar to the auctions described in co-pending U.S. patent application Ser. No. 13/933,066 (entitled "System and Method for Conducting an Online Auction Via a Social Networking Forum", filed Jul. 1, 2013) which is hereby incorporated by reference in its entirety.

The third party management module 170 may be configured to facilitate registration of third parties with the system, provide an interface for third parties to present content to the forum, provide relevant items of content shared in the forum to third parties, and/or otherwise manage access of third parties to members and/or content of the forum.

In some implementations, the third party management module 170 may be configured to allow a third party with access to a forum to participate in the forum in a manner the same or similar to a member of the forum. The third party management module 170 may be configured to facilitate registration by a third party to access the system 10. For example, the third party management module 170 may be configured to require a third party to pay a transaction fee for access to the system, for particular types of access to a forum, for reports related to access of content provided by the third party, and/or for other types of participation in the system. In another example, the third party management module 170 may be configured to allow a third party to access a forum based on a contractual relationship between a provider associated with the forum and a third party. In this example, the information stored for a cohort may include information relating to one or more third parties that may be allowed to access the forum. For example, for a cohort related to a shared experience of taking a same flight, a provider such as an airport may enter into a contractual relationship with a vendor located at the airport to provide access to a forum associated with a cohort that may be located near the location of the vendor in the airport. In the foregoing example, examples of third parties include vendors located at the departure airport, vendors at the destination airport, rental car entities at the destination airport, hotels near the destination airport, and/or other third parties that may be interested in communicating with passengers taking the flight.

The third party management module 170 may be configured to restrict participation by a third party in a forum based on the type of access allowed to the third party. Types of access may include, for example, sharing an item of content via the forum, presenting an item of content for rating, rating an item of content, presenting an item of content for voting, voting on an item of content, presenting an item of content for an auction, bidding on an item of content, providing advertising content via the forum, having read-only access to the forum, having access to contact information of one or more members of the forum and/or other types of access to a forum. The type of access allowed to a forum may be based on the type of access allowed by the cohort associated with the forum, based on an amount of transaction fee paid by the third party, based on a contractual relationship between a provider associated with the forum and the third party, and/or based on other information related to the third party and/or the forum.

The third party management module 170 may be configured to provide reports to a third party for one or more forums which the third party may access. For example, responsive to a third party presenting advertising content to a forum, the third party management module 170 may be configured to provide a report relating to a percentage of the number of forum members who viewed the advertising, clicked-through on a click presented in the advertising, shared the advertising content, used a promotion presented in the advertising content, and/or otherwise interacted with the advertising content, a rating of the advertising content by forum members, a voting tally of the advertising content by forum members, and/or other information related to the advertising content. In another example, responsive to a third party presenting an item of content for an auction, the third party management module 170 may be configured to provide a report relating to a number of bids placed, an amount of each bid placed, forum members who placed bids, a selling price of the item of content related to other items of content auctioned in the forum, and/or other information related to the item of content presented for auction. In some implementations, the third party management module 170 may be configured to provide reports comparing member interaction with third party content items across a plurality of forums to which the third party is allowed access.

The role-based permission module 180 may be configured to tailor access to the system based on roles of various users including, for example, a role in the system, a role in a cohort, a role as a third party, a role as a provider of the shared experience, and/or other roles. The one or more roles may include system-level roles, cohort-level roles, third party level roles, and/or other types of roles. System-level roles may grant access to various system features such as for example, access to one or more modules, access to content stored at a storage module, and/or other access to system features. System-level roles may be configured, for example, to manage storage of cohort information, access to third parties, and/or other system-level features. Different system-level roles may be granted that provide access to different system features. Cohort-level roles may grant access to various forum features such as, for example, access to the content shared by the forum, access to contact information of users of the cohort, and/or other access. Different cohort-based roles may be granted that provide access to different cohort features. The role-based permissions module 180 may maintain a plurality of roles, including, for example, administrator, cohort user, third party, provider of shared experience, and/or other roles.

The storage module 105 may be configured to store information related to system usage, one or more cohorts, and/or one or more forums. For example, the storage module 105 may be configured to store information related to cohorts, forums, third parties, and/or other information obtained, accessed, and/or processed via the system. The storage module 105 may further store content developed and/or shared via the system. In some implementations, the storage module 105 may comprise the non-transitory computer readable medium configured to store instructions executable by the processor 101.

The reporting module 190 may be configured to facilitate analysis and report information related to system usage, one or more cohorts, and/or one or more forums. The reporting module 190 may also be configured to prepare and/or display statistics and/or reports regarding the information related to system usage, cohort information, forum content, third party access, and/or other information obtained, accessed, and/or processed by the system. For example, the reporting module 190 may prepare and/or display a report provided by the third party management module 170 to a third party allowed access to one or more forums.

In some implementations, the system may also comprise a provider management module 199. The provider management module 199 may be configured to facilitate registration of a provider of a shared experience, storage of information related to a cohort associated with the shared experience, management of a forum associated with the cohort, and/or other functionality related to managing the shared experience. The provider management module 199 may be configured to allow a provider of a shared experience to control access and participation by members, third parties, administrators of the system, and/or other individuals to the forum associated with a cohort for the shared experience.

The provider management module 199 may also be configured to allow a provider to restrict the functionality available via the forum. For example, the provider management module 199 may be configured to allow a provider to enable voting and rating content items in the forum, but not allow auctioning of items in the forum. In another example, the provider management module 199 may be configured to allow a provider to restrict third party participation in the module, monitor the reports and/or statistics provided to third parties in relation to the forum, and/or otherwise control third party access to the forum. The provider management module 199 may be configured to allow a provider to specify the types and/or substance of content to police and to transmit to governmental organizations. Other examples and configurations of allowed functionality exist.

In some implementations, a same provider may be associated with a plurality of shared experiences (and a plurality of respective cohorts). The provider management module may be configured to allow a provider to manage some or all associated forums in a same way or on a case-by-case individual basis. Examples of providers include airports, airlines, transportation companies, entertainment venues, sports arenas, sports leagues, and/or other entities that provide shared experiences.

Figure 2:
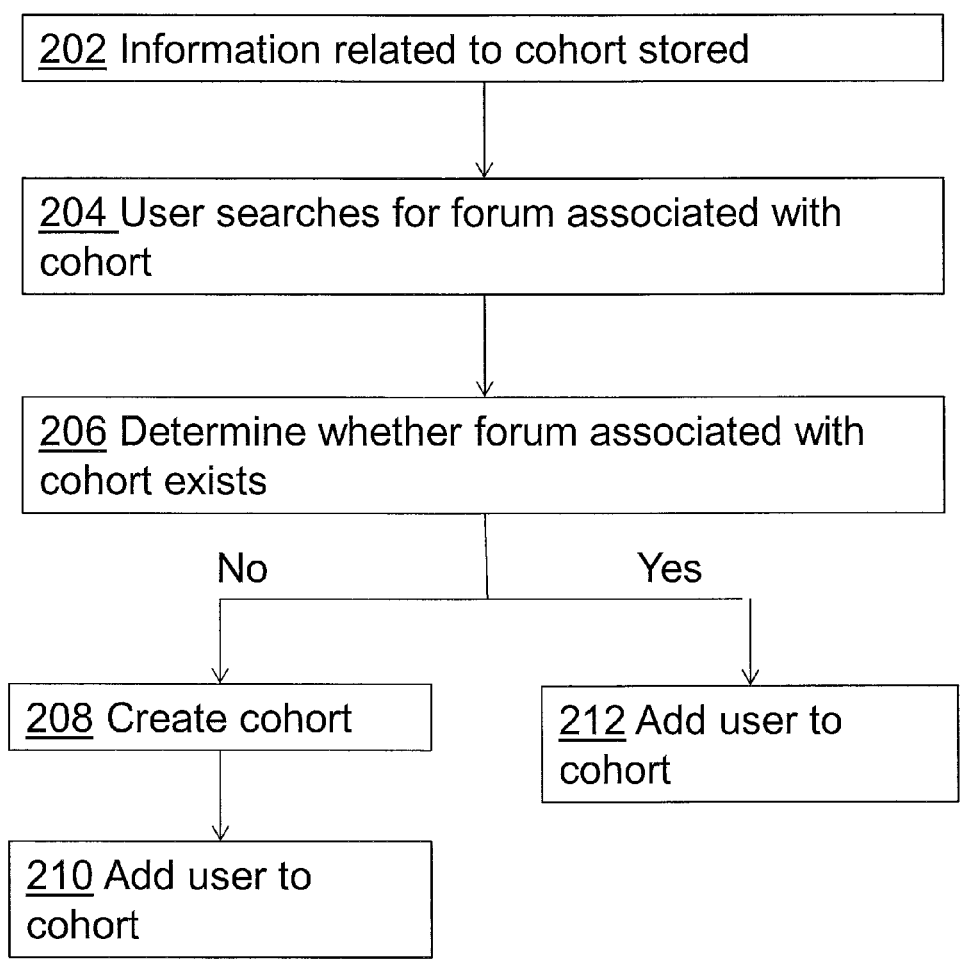
FIG. 2 illustrates a process for facilitating creation of an ad hoc social networking forum for a cohort of users, according to various implementations of the invention.
Figure 3:
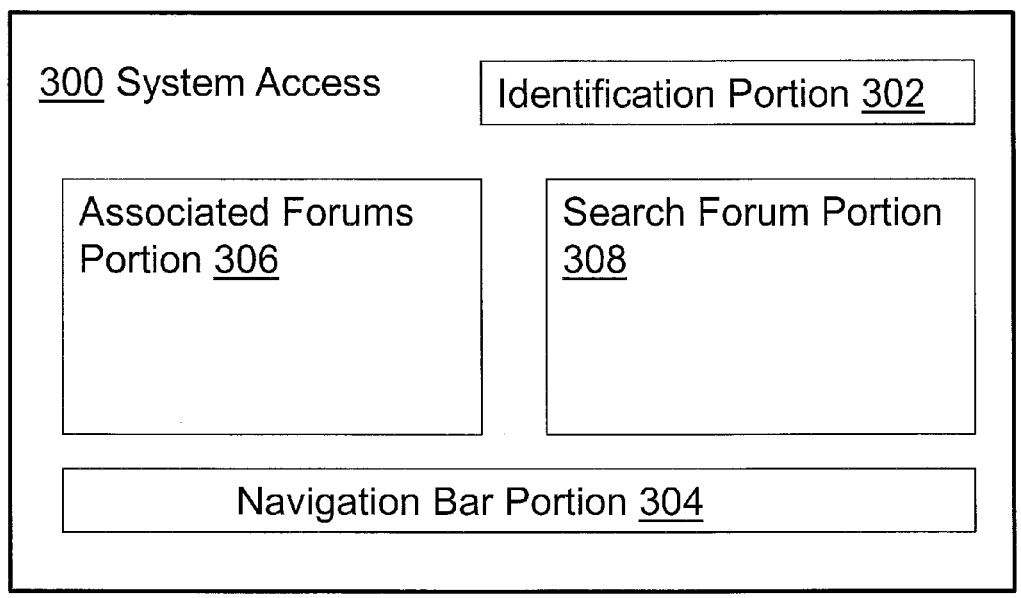
FIG. 3 illustrates an exemplary screenshot of a template by which a user may access the system, according to various implementations of the invention.

FIG. 2 illustrates a process for facilitating creation of an ad hoc social networking forum for a cohort of users, according to various implementations of the invention. FIG. 3 illustrates an exemplary screenshot of a template by which a user may access the system, according to various implementations of the invention. Processing will be described with respect to FIG. 2 in reference to the screen shots illustrated in FIG. 3.

The described operations of FIG. 2 and other figures may be accomplished using some or all of the system components described in detail above and, in some implementations, various operations may be performed in different sequences. In other implementations, additional operations may be performed along with some or all of the operations shown in FIG. 2 and the other figures. In yet other implementations, one or more operations may be performed simultaneously. In yet other implementations, one or more combinations of various operations may be performed. Some implementations may not perform all of the operations described with relation to FIG. 2 and other figures. Accordingly, the operations described are exemplary in nature and, as such, should not be viewed as limiting.

In some embodiments, the operations described in FIG. 2 and the other figures may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations described in FIG. 2 and the other figures in response to instructions stored electronically on an electronic storage medium. The one or more processing devices may include one or more devices configured through hardware, firmware, and/or software to be specifically designed for execution of one or more of the operations described in FIG. 2 and the other figures.

The screenshots illustrated in FIG. 3 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting. Interface 300 and other interfaces described herein may be implemented as a web page communicated from computing device 100 to a user computing device (e.g., user computing device 30a, 30b, . . . , 30n), a provider computing device (e.g., provider computing device 40a, 40b, . . . , 40n), an application such as a mobile application executing on a client computing device, provider computing device, and/or other computing device that receives generates the interface based on information communicated from computing device 100, and/or other interface. Whichever type of interface is used, computing device 100 may communicate the data and/or formatting instructions related to the interface to the client, causing the client computing device, provider computing device, and/or other computing device to generate the various interfaces of FIG. 3 and other drawing figures. Furthermore, computing device 100 may receive data from the client computing device, provider computing device, and/or other computing device via the various interfaces, as would be appreciated.

In an operation 202, information related to a cohort may be stored. The information may be stored prior to receiving any request from a user of a cohort to join a social networking forum for the cohort. The cohort management module 110 may facilitate obtaining and/or storing the information related to the cohort. The cohort management module 110 may obtain and/or store information related to the cohort in a manner the same or similar as that described above.

In an operation 204, a user may search for a forum associated with a cohort. The forum management module 120 may facilitate a user search for a forum. The forum management module 120 may facilitate searching for a forum in a manner the same or similar to that described above.

In an operation 206, a determination may be made as to whether a forum associated with the cohort exists. The forum management module 120 may determine whether a forum associated with the cohort has been created. The forum management module 120 may determine whether a forum associated with the cohort has been created in a manner the same or similar to that described above.

In an operation 208, responsive to a determination that a forum associated with the cohort has not been created, a forum associated with the cohort may be created. The forum management module 120 may create the forum associated with the cohort. The forum management module 120 may create the forum associated with the cohort in a manner the same or similar to that described above.

In an operation 210, responsive to creating the forum associated with the cohort, the user may be added to the cohort. The forum management module 120 may add the user to the forum. The forum management module 120 may add the user to the forum in a manner the same or similar to that described above.

In an operation 212, responsive to a determination that a forum associated with the cohort has already been created, the user may be added to the cohort. The forum management module 120 may add the user to the forum. The forum management module 120 may add the user to the forum in a manner the same or similar to that described above.

FIG. 3 illustrates an exemplary screenshot of an interface 300 that includes a template for system access, according to various implementations of the invention. In some implementations, user interface 300 may be presented that includes an exemplary template for system access. The template for system access may be presented to a user upon initial access of the system. The user interface 300 may include, for example, identification portion 302, navigation bar portion 304, associated forums portion 306, search forum portion 308, and/or other portions that display information.

In some implementations, identification portion 302 may display, for example, a user's name and a link via which the user may log out of the system. In some implementations, identification portion 302 may also include a link to the user's profile information, via which the user may view or edit profile information. In some implementations, navigation bar 304 may display one or more links to one or more templates available via the system 10. For example, the navigation bar 304 may display links related to the template for system access, the template for forum access, and/or other templates to present functionality to a user.

In some implementations, associated forums portion 306 may display one or more forums of which the user is a member. The forums may be displayed with information relating to the forum, a link to access the forum, new content shared via the forum, and/or other information relating to the forum.

In some implementations, search forum portion 308 may display one or more display components by which the user may search for a forum. For example, the search forum portion 308 may display a text box via which the user may enter an identifier for a cohort, a text box via which the user may enter keywords used in a keyword search for a forum, a drop down menu for type of shared experience associated with a cohort, a drop down menu for sub-type of shared experience, a date entry user component (e.g., a text box with an associated calendar), a time entry user component (e.g., a text box with an associated clock), a location entry user component (e.g., a text box, a link to enter current location, and/or other location entry user component), and/or other display components by which the user may search for a forum. The search forum portion 208 may also display a results screen. The results screen may display one or more forums that match the search terms entered by the user. For an individual forum displayed in the search results, information relating to the forum, new content shared via the forum, and/or other information relating to the forum may be displayed. Responsive to a determination that the user is a member of the individual forum, a link to access the forum may also be displayed. Responsive to a determination that the user is not a member of the individual forum, a link to join the forum may also be displayed.

Figure 4:
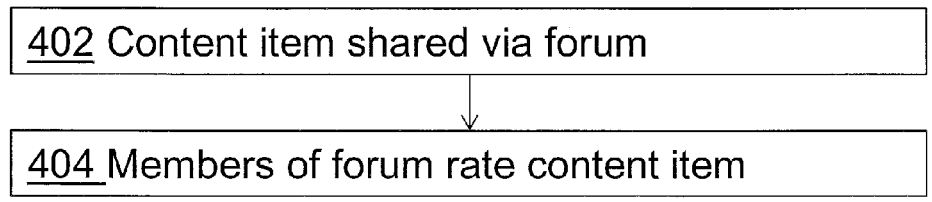
FIG. 4 illustrates a process for participating in an ad hoc social networking forum associated with a cohort of users, according to various implementations of the invention.
Figure 5:
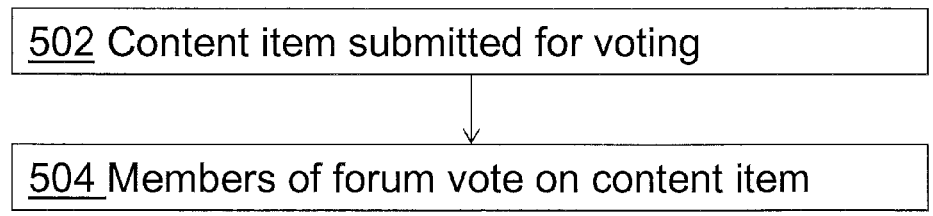
FIG. 5 illustrates a process for participating in an ad hoc social networking forum associated with a cohort of users, according to various implementations of the invention.
Figure 6:
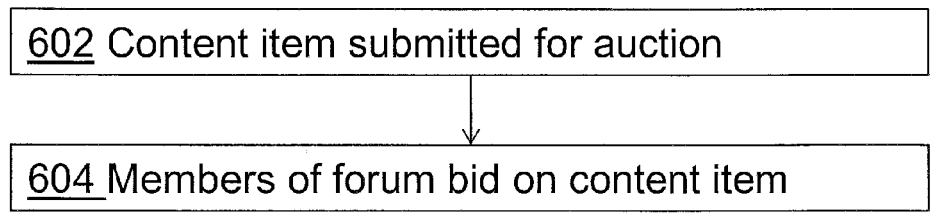
FIG. 6 illustrates a process for participating in an ad hoc social networking forum associated with a cohort of users, according to various implementations of the invention.
Figure 7:
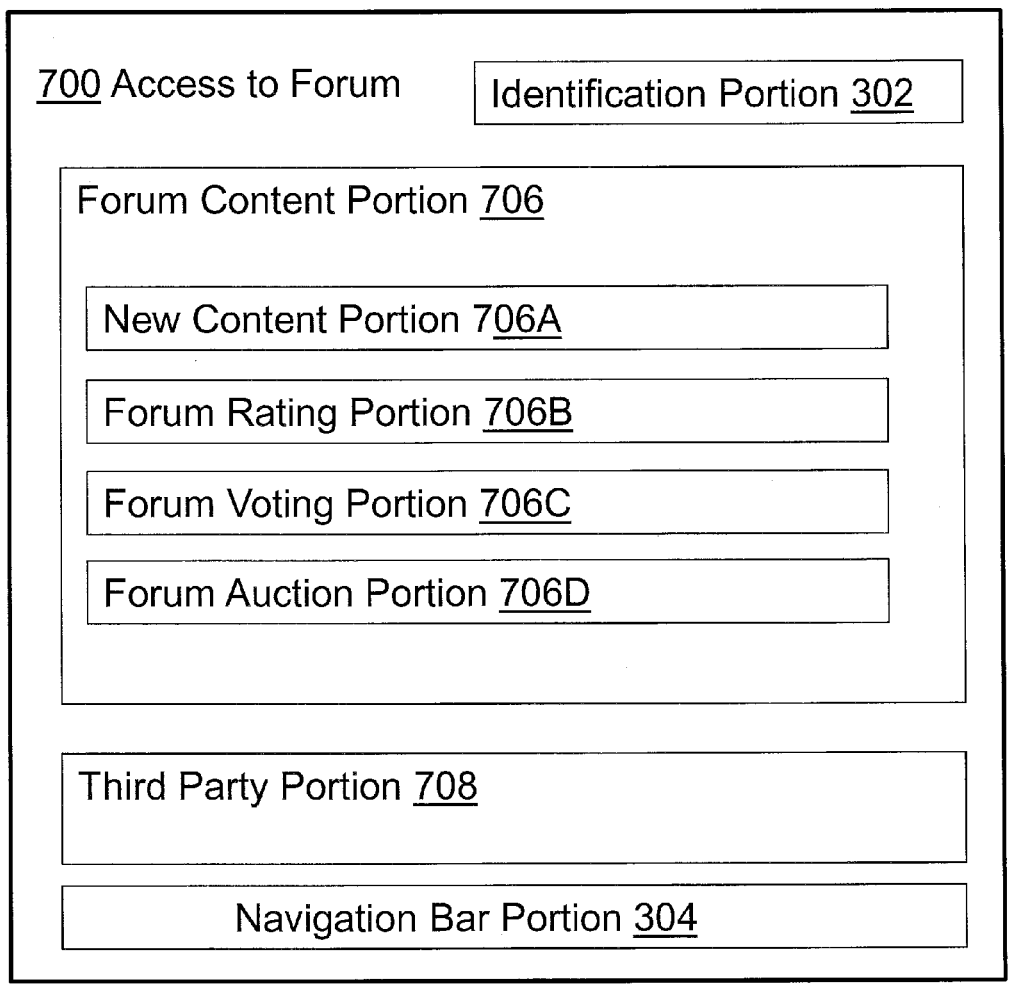
FIG. 7 illustrates an exemplary screenshot of a template by which members of a forum may participate in an auction for an item of content, according to various implementations of the invention.

FIG. 4 illustrates a process for participating in an ad hoc social networking forum associated with a cohort of users, according to various implementations of the invention. FIG. 5 illustrates a process for participating in an ad hoc social networking forum associated with a cohort of users, according to various implementations of the invention. FIG. 6 illustrates a process for participating in an ad hoc social networking forum associated with a cohort of users, according to various implementations of the invention. FIG. 7 illustrates an exemplary screenshot of a template by which members of a forum may participate in an auction for an item of content, according to various implementations of the invention. Processing will be described with respect to FIGS. 4-6 in reference to the screen shots illustrated in FIG. 7.

In an operation 402, a content item may be shared via the forum. The content item may be shared by a member of the forum, a third party, a provider associated with the forum, and/or other entity with access to the forum. The forum management module 120 may facilitate the sharing the content item. The forum management module 110 may facilitate sharing the content item in a manner the same or similar as that described above.

In an operation 404, one or more members of the forum may rate the content item. The forum management module 120 may facilitate rating of the content item by the one or more members of the forum. The forum management module 120 may facilitate rating of the content item by the one or more members of the forum in a manner the same or similar to that described above.

In an operation 502, a content item may be submitted for voting via the forum. The content item may be submitted by a member of the forum, a third party, a provider associated with the forum, and/or other entity with access to the forum. The forum management module 120 may facilitate submitting the content item for voting. The forum management module 110 may facilitate submitting the content item for voting in a manner the same or similar as that described above.

In an operation 504, one or more members of the forum may vote on the content item. The forum management module 120 may facilitate voting on the content item by the one or more members of the forum. The forum management module 120 may facilitate voting on the content item by the one or more members of the forum in a manner the same or similar to that described above.

In an operation 602, a content item may be submitted for auction via the forum. The content item may be submitted by a member of the forum, a third party, a provider associated with the forum, and/or other entity with access to the forum. The forum management module 120 may facilitate submitting the content item for auction. The forum management module 110 may facilitate submitting the content item for auction in a manner the same or similar as that described above.

In an operation 604, one or more members of the forum may bid on the content item. The forum management module 120 may facilitate bidding on the content item by the one or more members of the forum. The forum management module 120 may facilitate bidding on the content item by the one or more members of the forum in a manner the same or similar to that described above.

FIG. 7 illustrates an exemplary screenshot of an interface 700 that includes a template for forum access, according to various implementations of the invention. In some implementations, user interface 700 may be presented that includes an exemplary template for forum access. The template for system access may be presented to a user upon initial access of the system. The user interface 700 may include, for example, identification portion 302, navigation bar portion 304, forum content portion 706, third party portion 308, and/or other portions that display information.

In some implementations, forum content portion 706 may display information related to the forum, content items shared via the forum, and/or one or more sub-portions. For example, forum content portion 706 may comprise one or more of: new content portion 706A, forum rating portion 706B, forum voting portion 706C, forum auction portion 706D, and/or other sub-portions.

In some implementations, new content portion 706A may display a predetermined number of items of content most recently shared, interacted with, and/or otherwise accessed. For an individual item of content, the content of the item, an author of the item, comments related to the item, a rating of the item, a vote tally for the item, a rating button, a voting button, and/or other information relating to the content may be displayed. Responsive to a determination that the item is presented for auction, a current bid, a minimum bid, a place bid button, and/or other information related to bidding on the item may be displayed.

In some implementations, forum rating portion 706B may display a predetermined number of items of content with the highest rating. For an individual item of content, the content of the item, an author of the item, comments related to the item, a rating of the item, and/or other information relating to the rating of the item may be displayed. The forum rating portion 706B may also facilitate changing the order in which items of content are shown. For example, forum rating portion 706B may display links and/or other user components by which a member may display a predetermined number of content items with the lowest ratings, content items most recently rated, content items not yet rated, and/or other sets of content items.

In some implementations, forum voting portion 706C may display a predetermined number of items of content with the highest vote tally. For an individual item of content, the content of the item, an author of the item, comments related to the item, a vote tally of the item, and/or other information relating to the voting of the item may be displayed. The forum voting portion 706C may also facilitate changing the order in which items of content are shown. For example, forum voting portion 706C may display links and/or other user components by which a member may display a predetermined number of content items with the lowest vote tally, content items most recently vote on, content items not yet voted on, and/or other sets of content items.

In some implementations, forum auction portion 706D may display a predetermined number of items of content with the least amount of time left to be auctioned. For an individual item of content, the content of the item, an author of the item, comments related to the item, a current bid of the item, a member who made the current bid, a time left for auction, and/or other information relating to the auction of the item may be displayed. The forum auction portion 706D may also facilitate changing the order in which items of content are shown. For example, forum auction portion 706D may display links and/or other user components by which a member may display a predetermined number of content items with the lowest current bids, content items most recently bid on, content items not yet bid on, content items by type of item, content items by date of submission for auction, content items with the most number of bids, content items with the largest frequency of bid submissions, and/or other sets of content items.

In some implementations, third party portion 708 may display information related to one or more third parties that have access to the forum. Third party portion 708 may display one or more items of content provided by a third party, advertising content provided by a third party, and/or other content and/or information relating to the one or more third parties. In some implementations, third party portion 708 may also display contact information related to the one or more third parties allowed access to the forum. In some implementations, the one or more items of content and advertising content provided by the one or more third parties may be displayed in the forum content portion 706, and the forum access template 700 may not comprise a third party portion 708.

Figure 8:
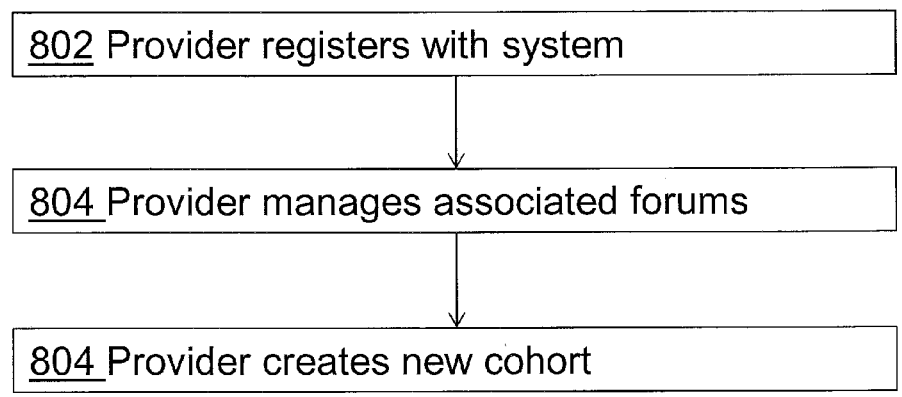
FIG. 8 illustrates a process for a provider to access the system, according to various implementations of the invention.
Figure 9:
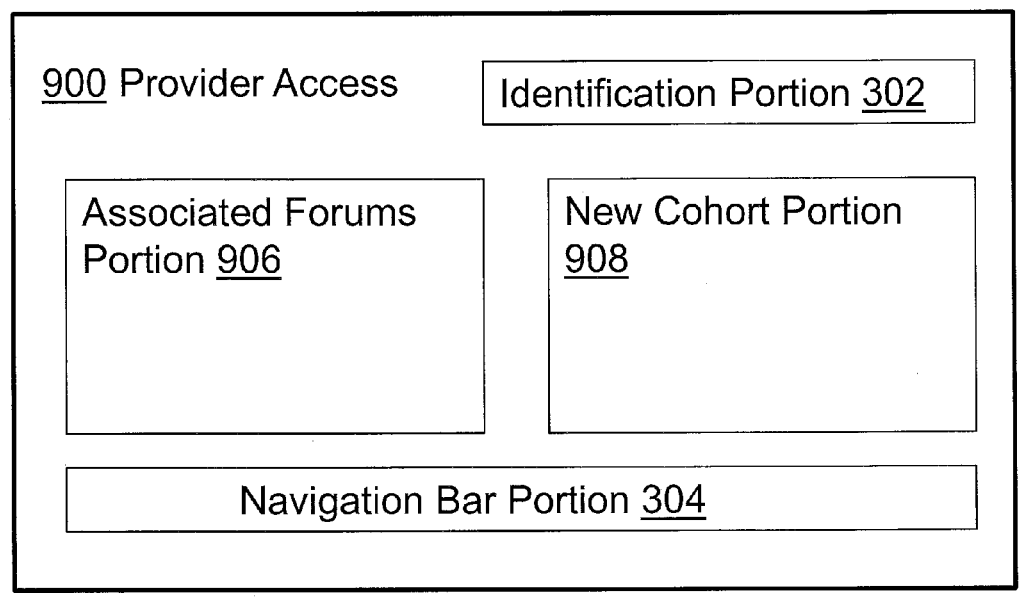
FIG. 9 illustrates an exemplary screenshot of a template by which a provider accesses the system, according to various implementations of the invention.

FIG. 8 illustrates a process for a provider to access the system, according to various implementations of the invention. FIG. 9 illustrates an exemplary screenshot of a template by which a provider accesses the system, according to various implementations of the invention.

In an operation 802, a provider may register with the system. The provider management module 195 may facilitate registration by the provider. The provider management module 195 may facilitate registration by the provider in a manner the same or similar as that described above.

In an operation 804, a provider may manage associated forums. The provider management module 195 may facilitate management, by the provider, of associated forums. The provider management module 195 may facilitate management, by the provider, of associated forums in a manner the same or similar to that described above.

In an operation 806, the provider may create a new cohort. The provider management module 195 may facilitate creation, by the provider, of a new cohort. The provider management module 195 may facilitate creation, by the provider, of a new cohort in a manner the same or similar to that described above.

FIG. 9 illustrates an exemplary screenshot of an interface 800 that includes a template for provider access, according to various implementations of the invention. In some implementations, user interface 900 may be presented that includes an exemplary template for provider access. The template for provider access may be presented to a provider upon initial access of the system. The user interface 900 may include, for example, identification portion 302, navigation bar portion 304, associated forums portion 906, new cohort portion 908, and/or other portions that display information.

In some implementations, associated forums portion 906 may display one or more forums associated with respective one or more cohorts for which the provider provided the related information. The forums may be displayed with information relating to the forum, a link to access the forum, new content shared via the forum, functionality provided via the forum, an ability to edit functionality provided via the forum, third parties with access to the forum, an ability to edit third party access to the forum, and/or other information relating to the forum.

In some implementations, new cohort portion 908 may display one or more display components by which the provider may create a forum. For example, the new cohort portion 908 may display one or more input components via which the provider may input a name for the cohort, date on which a shared experience associated with the cohort is schedule to occur, a time at which the shared experience associated with the cohort is schedule to occur, a location at which the shared experience associated with the cohort is schedule to occur, a type of the shared experience, a sub-type of the shared experience, one or more users associated with the shared experience, contact info for the one or more users, one or more authorized users for the experience, one or more third parties with access to a forum associated with the cohort, and/or other information related to the cohort.

The computing device 100 may be any computing device such as, for example, a server, a desktop computer, laptop computer, personal digital assistant, smart phone, and/or any other computing device. Other configurations and system architectures may be used. For example, although not shown, computing device 100 may be or include one or more servers connected to one or more clients via a network 20 such as a Wide Area Network, Local Area Network, the Internet, a cloud-based network and/or other network or combination thereof. The computing device 100 may be capable of communicating with network 20, storage module 105 and one or more other devices, such as one or more user computing devices and/or one or more provider computing devices.

A user computing device 30n may facilitate communication with the computing device. For example, a user may communicate with the computing device 100 via a user computing device 30n. In some implementations, the term user may be interchangeably used herein with the term user computing device. In some implementations, the term member may also be interchangeably used herein with the term user computing device. In some implementations, a user's actions and/or functionality as described herein may be carried out and/or implemented by a user computing device 30n. In some implementations, a member's actions and/or functionality as described herein may be carried out and/or implemented by a user computing device 30n. The user computing device 30n may be any computing device such as, for example, a server, a desktop computer, laptop computer, personal digital assistant, smart phone, and/or any other computing device. The user computing device 30n may be capable of communicating with network 20, computing device 100, the storage module 105, and one or more other devices.

A provider computing device 40n may facilitate communication with the computing device 100. For example, a provider may communicate with the computing device 100 via a provider computing device 40n. In some implementations, the term provider may be interchangeably used herein with the term provider computing device. In some implementations, a provider's actions and/or functionality as described herein may be carried out and/or implemented by a provider computing device 40n. A provider computing device 40n may be any computing device such as, for example, a server, a desktop computer, laptop computer, personal digital assistant, smart phone, and/or any other computing device. The provider computing device 40n may be capable of communicating with network 20, computing device 100, the storage module 105, and one or more other devices.

The storage module 105 may be at least one database that stores system data such as data related to system usage, one or more cohorts, one or more forums, third parties, and/or or any other data. The storage module 105 may be associated and communicate with the computing device 100.

The one or more databases comprising the storage module 105 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, the storage module 105 may be part of or hosted by a computing device on the network 20. In some implementations, the storage module 105 may be part of or hosted by the computing device 100. In some implementations, the storage module 105 may be physically separate from the computing device 100 but may be operably communicable therewith.

In some implementations, the storage module 105 may comprise electronic storage media that electronically stores information. The storage module 105 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The storage module 105 may include one or more virtual storage resources (e.g., cloud storage, a virtual private network, and/or other virtual storage resources). The storage module 105 may store software algorithms, information determined by processor 101, information received from computing device 100, information received from user computing devices 30a, 30b, . . . 30n, information received from provider computing devices 40a, 40b, . . . 40n, information received from third parties, and/or other information that enables computing device 100 to function as described herein.

Processor(s) 101 is configured to provide information processing capabilities in computing device 100. As such, processor 101 may include one or more of a digital processor, an analog processor, a digital circuit designed to process information, an analog circuit designed to process information, a state machine, and/or other mechanisms for electronically processing information. Although processor 101 is shown in FIG. 1 as a single entity, this is for illustrative purposes only. In some implementations, processor 101 may include a plurality of processing units. These processing units may be physically located within the same device, or processor 101 may represent processing functionality of a plurality of devices operating in coordination. The processor 101 may be configured to execute modules 110, 120, 130, 140, 150, 160, 170, 180, 190, 195, and/or 199. Processor 101 may be configured to execute modules 110, 120, 130, 140, 150, 160, 170, 180, 190, 195, and/or 199 by software; hardware; firmware; some combination of software, hardware, and/or firmware; and/or other mechanisms for configuring processing capabilities on processor 101.

It should be appreciated that although modules 110, 120, 130, 140, 150, 160, 170, 180, 190, 195, and/or 199 are illustrated in FIG. 1 as being co-located within a single processing unit, in implementations in which processor 101 includes multiple processing units, one or more of modules 110, 120, 130, 140, 150, 160, 170, 180, 190, 195, and/or 199 may be located remotely from the other modules. The description of the functionality provided by the different modules 110, 120, 130, 140, 150, 160, 170, 180, 190, 195, and/or 199 described below is for illustrative purposes, and is not intended to be limiting, as any of modules 110, 120, 130, 140, 150, 160, 170, 180, 190, 195, and/or 199 may provide more or less functionality than is described. For example, one or more of modules 110, 120, 130, 140, 150, 160, 170, 180, 190, 195, and/or 199 may be eliminated, and some or all of its functionality may be provided by other ones of modules 110, 120, 130 140, 150, 160, 170, 180, 190, 195, and/or 199. As another example, processor 101 may be configured to execute one or more additional modules that may perform some or all of the functionality attributed below to one of modules 110, 120, 130, 140, 150, 160, 170, 180, 190, 195, and/or 199.

In addition, implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A system for facilitating creation of an ad hoc social networking forum for a cohort of users, the system comprising:
    one or more physical processors programmed with computer readable instructions to:
        obtain, from one or more publicly available sources, information related to a first cohort prior to receiving a user request to join a first social networking forum that is related to the first cohort, the first cohort comprising a plurality of users that have a pre-established association with a first experience scheduled to occur at a first time, first date, and a first location, the information related to the first cohort comprising information related to the first experience; and
        receive a request from a first user of the first cohort to join the first social networking forum associated with the first cohort;
        determine whether the first social networking forum has been created; and
        responsive to a determination that the first social networking forum has not been created:
            create the first social networking forum; and
            add the first user as a member of the first social networking forum; and
        facilitate sharing of one or more items of content via the first social networking forum.

2. The system of claim 1, wherein the one or more physical processors are programmed with computer readable instructions to:
    receive a request from a second user of the first cohort to join the first social networking forum associated with the first cohort;
    determine whether the first social networking forum has been created; and
    responsive to a determination that the first social networking forum has been created:
        add the second user as a second member of the first social networking forum.

3. The system of claim 1, wherein the one or more physical processors are programmed with computer readable instructions to receive the request from the first user by:
    displaying, on a display of the computing device of the first user, a selectable list comprising a plurality of cohorts including the first cohort, wherein the cohort management module is configured to have obtained information related to each individual cohort of the plurality of cohorts prior to receiving a user request to join an individual one of the plurality of social networking forums; and
    receiving, from the first user, a selection of the first cohort.

4. The system of claim 3, wherein the plurality of cohorts comprise one or more cohorts with respective one or more locations within a pre-determined distance of a current location of a computing device of the first user.

5. The system of claim 3, wherein the one or more physical processors are programmed with computer readable instructions to:
    receive a selection of a location from the first user,
    wherein the plurality of cohorts comprise one or more cohorts with respective one or more locations within a pre-determined distance of the selected location.

6. The system of claim 1, wherein the one or more physical processors are programmed with computer readable instructions to:
    register a first provider of the first experience;
    receive, from the first provider, the information related to the first cohort; and
    facilitate management, by the first provider, of participation by one or more members in the first social networking forum.

7. The system of claim 1, wherein the one or more physical processors are programmed with computer readable instructions to facilitate rating, by one or more members of the first social networking forum, on an item of content shared via the first social networking forum.

8. The system of claim 1, wherein the one or more physical processors are programmed with computer readable instructions to facilitate voting, by one or more members of the first social networking forum, on an item of content shared via the first social networking forum.

9. The system of claim 1, wherein the one or more physical processors are programmed with computer readable instructions to conduct an auction on an item of content shared via the first social networking forum.

10. The system of claim 1, wherein one or more physical processors are programmed with computer readable instructions to:
    manage access of a third party to the first social networking forum; and
    facilitate provision of advertising content by the third party to the first social networking forum.

11. A computer-implemented method for facilitating creation of an ad hoc social networking forum for a cohort of users, the method being implemented in a computer system comprising one or more physical processors programmed with computer readable instructions to, the method comprising:
  obtaining, by the one or more physical processors, from one or more publicly available sources, information related to a first cohort prior to receiving a user request to join a first social networking forum that is related to the first cohort, the first cohort comprising a plurality of users that have a pre-established association with a first experience scheduled to occur at a first time, first date, and a first location, the information related to the first cohort comprising information related to the first experience; and
  receiving, by the one or more physical processors, a request from a first user of the first cohort to join the first social networking forum associated with the first cohort;
  determining, by the one or more physical processors, whether the first social networking forum has been created; and
  responsive to a determination that the first social networking forum has not been created:
    creating, by the one or more physical processors, the first social networking forum; and
    adding, by the one or more physical processors, the first user as a member of the first social networking forum; and
  facilitating, by the one or more physical processors, sharing of one or more items of content via the first social networking forum.

12. The method of claim 11, further comprising:
  receiving, by the one or more physical processors, a request from a second user of the first cohort to join the first social networking forum associated with the first cohort;
  determining, by the one or more physical processors, whether the first social networking forum has been created; and
  responsive to a determination that the first social networking forum has been created:
    adding, by the one or more physical processors, the second user as a second member of the first social networking forum.

13. The method of claim 11, wherein receiving the request from the first user comprises:
  displaying, by the one or more physical processors, on the display of a computing device of the first user, a selectable list comprising a plurality of cohorts, wherein information related to each individual cohort of the plurality of cohorts has been obtained prior to receiving a user request to join an individual one of the plurality of social networking forums; and
  receiving, by the one or more physical processors, from the first user, a selection of the first cohort.

14. The method of claim 13, wherein the plurality of cohorts comprise one or more cohorts with respective one or more locations within a pre-determined distance of a current location of a computing device of the first user.

15. The method of claim 13, further comprising:
  receiving, by the one or more physical processors, a selection of a location from the first user,
  wherein the plurality of cohorts comprise one or more cohorts with respective one or more locations within a pre-determined distance of the selected location.

16. The method of claim 11, further comprising:
  registering, by the one or more physical processors, a first provider of the first experience;
  receiving, by the one or more physical processors, from the first provider, the information related to the first cohort; and
  facilitating, by the one or more physical processors, management, by the first provider, of participation by one or more members in the first social networking forum.

17. The method of claim 11, further comprising:
  facilitating, by the one or more physical processors, rating, by one or more members of the first social networking forum, on an item of content shared via the first social networking forum.

18. The method of claim 11, further comprising:
  facilitating, by the one or more physical processors, voting, by one or more members of the first social networking forum, on an item of content shared via the first social networking forum.

19. The method of claim 11, further comprising:
  conducting, by the one or more physical processors, an auction on an item of content shared via the first social networking forum.

20. The method of claim 11, further comprising:
  managing, by the one or more physical processors, access of a third party to the first social networking forum; and
  facilitating, by the one or more physical processors, provision of advertising content by the third party to the first social networking forum.

21. A system for facilitating creation of an ad hoc social networking forum for a cohort of users, the system comprising:
  one or more physical processors programmed with computer readable instructions to:
  obtain, from a first provider of a first experience, information related to a first cohort prior to receiving a user request to join a first social networking forum that is related to the first cohort, the first cohort comprising a plurality of users that have a pre-established association with the first experience scheduled to occur at a first time, first date, and a first location, the information related to the first cohort comprising information related to the first experience;
  obtain, from one or more publicly available sources, information related to a second cohort prior to receiving a user request to join a second social networking forum that is related to the second cohort, the second cohort comprising a second plurality of users that have a pre-established association with a second experience scheduled to occur at a second time, second date, and a second location, the information related to the second cohort comprising information related to the second experience;
  receive a request from a first user of the first cohort to join the first social networking forum associated with the first cohort;
  determine whether the first social networking forum has been created;
  responsive to a determination that the first social networking forum has not been created:
    create the first social networking forum; and
    add the first user as a member of the first social networking forum;
  facilitate sharing of one or more items of content via the first social networking forum;
  register the first provider of the first experience prior to obtaining information related to the first cohort; and
  facilitate management, by the first provider, of participation by one or more members in the first social networking forum.

22. The system of claim 21, wherein the one or more physical processors are programmed with computer readable instructions to:
- receive a request from a second user of the first cohort to join the first social networking forum associated with the first cohort;
- determine whether the first social networking forum has been created; and
- responsive to a determination that the first social networking forum has been created:
  - add the second user as a second member of the first social networking forum.

23. The system of claim 21, wherein the one or more physical processors are programmed with computer readable instructions to:
- obtain, from the first provider, information related to a second cohort prior to receiving a user request to join a second social networking forum that is related to the second cohort, the second cohort comprising a plurality of users that have a pre-established association with a second experience scheduled to occur at a second time, second date, and a second location, the information related to the second cohort comprising information related to the second experience;
- receive a request from a third user of the second cohort to join the second social networking forum associated with the second cohort;
- determine whether the second social networking forum has been created;
- responsive to a determination that the second social networking forum has not been created:
  - create the second social networking forum; and
  - add the third user as a member of the second social networking forum; and
- facilitate sharing of one or more items of content via the second social networking forum.

24. The system of claim 21, wherein the one or more physical processors are programmed with computer readable instructions to:
- determine which functionality to provide via the first social networking forum, wherein available functionality comprises: voting on a content item, rating a content item, or providing a content item for auction.

25. The system of claim 24, wherein the one or more physical processors are programmed with computer readable instructions to:
- facilitate access, by a third party, to the first social networking forum; and
- control participation by the third party in the first social networking forum.

26. A computer-implemented method for facilitating creation of an ad hoc social networking forum for a cohort of users, the method being implemented in a computer system comprising one or more physical processors programmed with computer readable instructions to, the method comprising:
- obtaining, by the one or more physical processors, from a first provider of a first experience, information related to a first cohort prior to receiving a user request to join a first social networking forum that is related to the first cohort, the first cohort comprising a plurality of users that have a pre-established association with the first experience scheduled to occur at a first time, first date, and a first location, the information related to the first cohort comprising information related to the first experience;
- obtaining, by the one or more physical processors, from one or more publicly available sources, information related to a second cohort prior to receiving a user request to join a second social networking forum that is related to the second cohort, the second cohort comprising a second plurality of users that have a pre-established association with a second experience scheduled to occur at a second time, second date, and a second location, the information related to the second cohort comprising information related to the second experience;
- receiving, by the one or more physical processors, a request from a first user of the first cohort to join the first social networking forum associated with the first cohort;
- determining, by the one or more physical processors, whether the first social networking forum has been created;
- responsive to a determination that the first social networking forum has not been created:
  - creating, by the one or more physical processors, the first social networking forum; and
  - adding, by the one or more physical processors, the first user as a member of the first social networking forum;
- facilitating, by the one or more physical processors, sharing of one or more items of content via the first social networking forum;
- registering, by the one or more physical processors, the first provider of the first experience prior to obtaining information related to the first cohort; and
- facilitating, by the one or more physical processors, management, by the first provider, of participation by one or more members in the first social networking forum.

27. The method of claim 26, further comprising:
- receiving, by the one or more physical processors, a request from a second user of the first cohort to join the first social networking forum associated with the first cohort;
- determining, by the one or more physical processors, whether the first social networking forum has been created; and
- responsive to a determination that the first social networking forum has been created:
  - adding, by the one or more physical processors, the second user as a second member of the first social networking forum.

28. The method of claim 26, further comprising:
- obtaining, by the one or more physical processors, from the first provider, information related to a second cohort prior to receiving a user request to join a second social networking forum that is related to the second cohort, the second cohort comprising a plurality of users that have a pre-established association with a second experience scheduled to occur at a second time, second date, and a second location, the information related to the second cohort comprising information related to the second experience;
- receiving, by the one or more physical processors, a request from a third user of the second cohort to join the second social networking forum associated with the second cohort;
- determining, by the one or more physical processors, whether the second social networking forum has been created;
- responsive to a determination that the second social networking forum has not been created:
  - creating, by the one or more physical processors, the second social networking forum; and adding, by the one or more physical processors, the third user as a member of the second social networking forum; and facilitating, by the one or more physical processors, sharing of one or more items of content via the second social networking forum.

29. The method of claim 26, further comprising:

determining, by the one or more physical processors, by the first provider, which functionality to provide via the first social networking forum, wherein available functionality comprises: voting on a content item, rating a content item, or providing a content item for auction.

30. The method of claim 29, further comprising:

facilitating, by the one or more physical processors, by the first provider, access to a third party to the first social networking forum; and controlling, by the one or more physical processors, by the first provider, participation of the third party in the first social networking forum.

* * * * *